(12) United States Patent
Hoffman et al.

(10) Patent No.: US 9,639,356 B2
(45) Date of Patent: May 2, 2017

(54) ARBITRARY SIZE TABLE LOOKUP AND PERMUTES WITH CROSSBAR

(71) Applicant: QUALCOMM Incorporated, San Diego, CA (US)

(72) Inventors: Marc M. Hoffman, Mansfield, MA (US); Ajay Anant Ingle, Austin, TX (US); Jose Fridman, Waban, MA (US)

(73) Assignee: Qualcomm Incorporated, San Diego, CA (US)

( * ) Notice: Subject to any disclaimer, the term of this patent is extended or adjusted under 35 U.S.C. 154(b) by 603 days.

(21) Appl. No.: 13/842,751

(22) Filed: Mar. 15, 2013

(65) Prior Publication Data
US 2014/0281421 A1 Sep. 18, 2014

(51) Int. Cl.
G06F 9/30 (2006.01)

(52) U.S. Cl.
CPC ...... *G06F 9/30032* (2013.01); *G06F 9/30036* (2013.01); *G06F 9/30072* (2013.01)

(58) Field of Classification Search
CPC .... G06F 9/3001; G06F 9/3006; G06F 9/3885; G06F 9/30014; G06F 9/3836
See application file for complete search history.

(56) References Cited

U.S. PATENT DOCUMENTS

| 4,293,941 | A  | * | 10/1981 | Muraoka ............... G06F 7/785 711/109 |
| 7,057,413 | B1 |   | 6/2006  | Young et al. |
| 7,822,947 | B2 |   | 10/2010 | Ford et al. |
| 8,072,238 | B1 |   | 12/2011 | Hutton |
| 2005/0172106 | A1 | * | 8/2005 | Ford et al. .................. 712/210 |
| 2006/0095726 | A1 | * | 5/2006 | Zaabab et al. ............... 712/205 |
| 2008/0065809 | A1 | * | 3/2008 | Eichenberger ...... G06F 12/0864 711/3 |
| 2008/0114806 | A1 | * | 5/2008 | Kosche .................... 707/104.1 |
| 2008/0244341 | A1 | * | 10/2008 | Yoshihara ................... 714/726 |
| 2009/0015589 | A1 | * | 1/2009 | Luick et al. ................ 345/427 |
| 2012/0079352 | A1 |   | 3/2012  | Frost et al. |
| 2013/0007337 | A1 |   | 1/2013  | Grow |

* cited by examiner

Primary Examiner — Farley Abad
(74) Attorney, Agent, or Firm — Toler Law Group, PC

(57) ABSTRACT

An example method of updating an output data vector includes identifying a data value vector including element data values. The method also includes identifying an address value vector including a set of elements. The method further includes applying a conditional operator to each element of the set of elements in the address value vector. The method also includes for each element data value in the data value vector, determining whether to update an output data vector based on applying the conditional operator.

20 Claims, 7 Drawing Sheets

ARBITRARY SIZE TABLE LOOKUP AND PERMUTES WITH CROSSBAR

FIELD OF DISCLOSURE

The present disclosure generally relates to processors, and more particularly to updating an output data vector in a processor.

BACKGROUND

A processor may receive a set of addresses to perform a direct table lookup to retrieve the elements data values stored at the set of addresses. In a simple case, the number of element data values to be looked up may be 32, and the table size may also be 32, hence a 32-to-32 permute operation may be used. However, in a more general case, the set of addresses may reference element data values in a table of arbitrary size larger than 32 or in different tables, and it may be necessary to search multiple tables for the element data values corresponding to the set of addresses. For example, if the processor receives a request to lookup 32 element data values based on a set of addresses, the processor may need to search up to 32 tables to find the 32 element data values. This may be time consuming and require a large amount of memory.

Further, the processor may be given a data vector to permute with a control to update an output vector. If N element data values need to be permuted, this may include N×N operations. This also may be time consuming.

Accordingly, there is a need for a system capable of efficiently performing a direct lookup and/or efficiently permuting a data vector.

BRIEF SUMMARY

This disclosure relates to processors. Methods, systems, and techniques for updating an output data vector in a processor are provided.

According to an embodiment, a method for updating an output data vector includes identifying a data value vector including element data values. The method also includes identifying an address value vector including a set of elements. The method further includes applying a conditional operator to each element of the set of elements in the address value vector. The method also includes for each element data value in the data value vector, determining whether to update an output data vector based on applying the conditional operator.

According to another embodiment, an apparatus for updating an output data vector includes a processor that is operable to identify a data value vector including element data values. The processor is also operable to identify an address value vector including a set of elements. The processor is further operable to apply a conditional operator to each element of the set of elements in the address value vector. The processor is also operable to for each element data value in the data value vector, determine whether to update an output data vector based on applying the conditional operator.

According to another embodiment, a computer-readable medium has stored thereon computer-executable instructions for performing operations including identifying a data value vector including element data values; identifying an address value vector including a set of elements; applying a conditional operator to each element of the set of elements in the address value vector; and for each element data value in the data value vector, determining whether to update an output data vector based on applying the conditional operator.

According to another embodiment, an apparatus for updating an output data vector includes means for identifying a data value vector including element data values; means for identifying an address value vector including a set of elements; means for applying a conditional operator to each element of the set of elements in the address value vector; and means for, for each element data value in the data value vector, determining whether to update an output data vector based on applying the conditional operator.

BRIEF DESCRIPTION OF THE DRAWINGS

The accompanying drawings, which form a part of the specification, illustrate embodiments of the invention and together with the description, further serve, to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Table Lookup Example
    1. Data Value Vector and Address Value Vector
    2. Update Output Data Vector Based on Applying a Conditional Operator
    3. Horizontal Permute Control Vector
  B. Permutation Example
III. Example Method
IV. Example Wireless Device

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Systems and methods are disclosed for updating an output data vector. In an embodiment, a method for updating an output data vector includes identifying a data value vector including element data values and identifying an address value vector including a set of elements. A conditional operator may be applied to each element of the set of elements in the address value vector. For each element data value in the data value vector, it may be determined whether to update an output data vector based on applying the conditional operator.

Additionally, element data values may be retrieved from the data value vector based on the determination of whether to update the output data vector. The retrieved element data values may be mapped to element data values in the output data vector based on the address value vector. The element data values may be updated in the output data vector with the retrieved element data values based on the mapping.

II. Example System Architecture

A. Table Lookup Example

Figure 1:
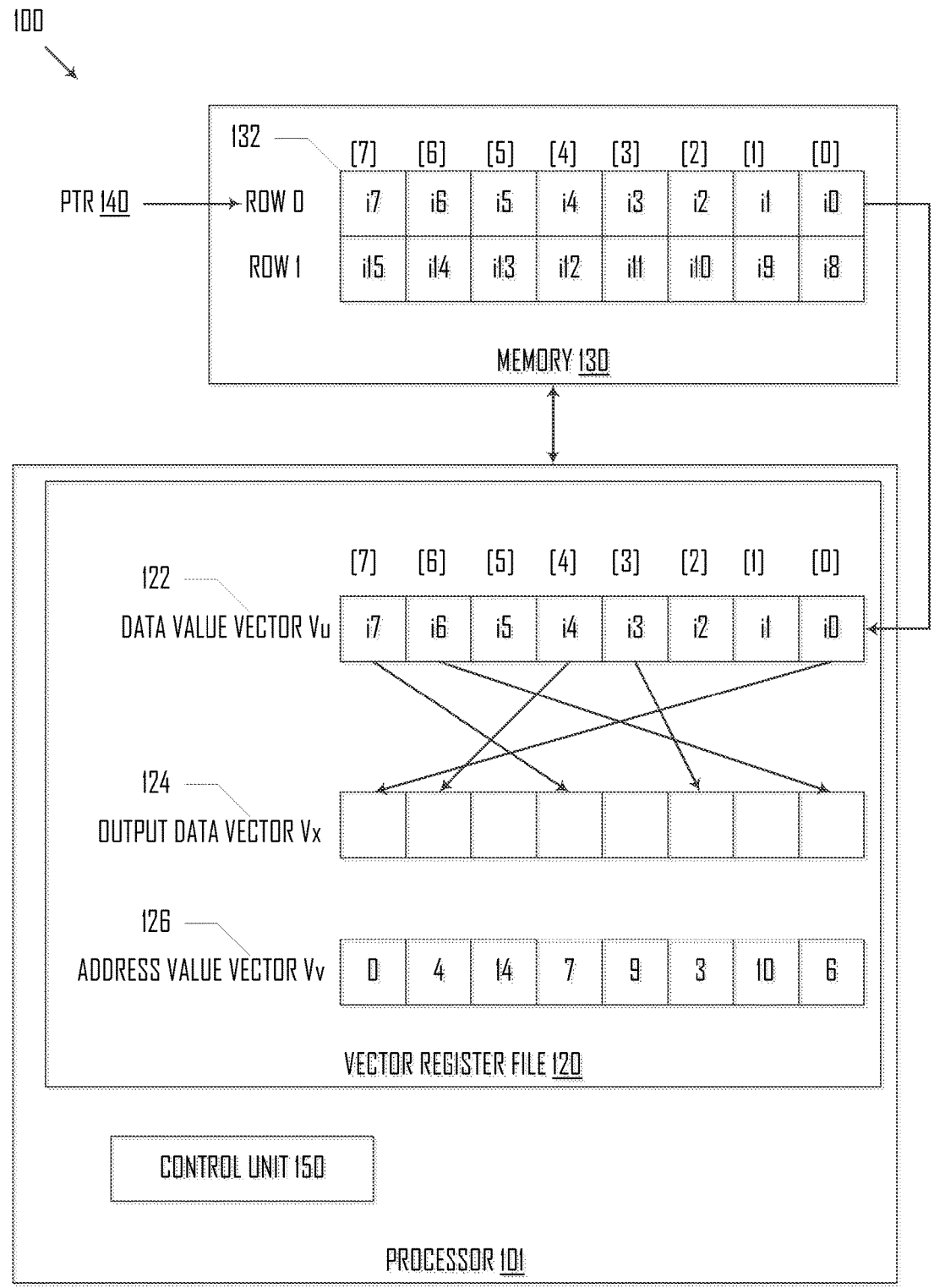
FIG. 1 is a block diagram illustrating a system for updating an output data vector, according to an embodiment.

FIG. 1 is a block diagram 100 illustrating a system for updating an output data vector Vx, according to an embodiment.

Diagram 100 includes a processor 101 that is coupled to a memory 130 and that updates an output data vector based on a condition. Processor 101 includes a vector register file 120 including a collection of vector registers. Vector register file 120 includes vector registers Vu (122), Vx (124), and Vv (126). This is not intended to be limiting. For example, in another embodiment, vector register file 120 may include more than or greater than 3 vector registers. In an example, vector register file 120 includes 32 vectors registers V0-V31, and each of vector registers Vu, Vx, and Vv may be any of the 32 vectors registers.

Memory 130 includes a table 132 including element data values. Table 132 includes two rows, row 0 and row 1. Row 0 of table 132 includes eight element data values, and row 1 of table 132 includes eight element data values. Pointer 140 is a pointer to table 132 in memory 130. Rather than having X quantity of tables that store element data values (where X is a whole number greater than one) and performing a direct lookup by searching each table, the element data values may be stored in a single table and looked up quickly as described in the present disclosure.

1. Data Value Vector and Address Value Vector

Processor 101 may receive a set of addresses to perform a direct lookup in table 132 to retrieve the element data values stored at the set of addresses. Processor 101 may include a control unit 150. In an embodiment, control unit 150 identifies an address value vector including a set of elements. In FIG. 1, the address value vector may be stored in vector register Vv, and processor 101 may identify vector register Vv as the address value vector including the set of elements. Each element of the set of elements may be an address corresponding to an element data value in table 132 to be retrieved. The processor may perform a quick lookup based on the address to determine the element data value stored at the address. In an example, Vv[0]=6 and corresponds to element data value "i6" in table 132, Vv[1]=10 and corresponds to element data value "i10" in table 132, and Vv[2]=3 and corresponds to element data value "i3" in table 132, and so on.

In an embodiment, control unit 150 identifies a data value vector including element data values. Element data values in table 132 may be read into the data value vector. In FIG. 1, the data value vector may be stored in vector register Vu, and processor 101 may identify vector register Vu as the data value vector including element data values from table 132.

Processor 101 may fetch element data values from table 132 and place the fetched element data values into the data value vector in a variety of ways. In an example, element data values in table 132 may be read into vector register Vu one row at a time. This may be beneficial when table 132 is too large to store in a vector register at once. When a row of table 132 is fetched from memory and stored in vector register Vu, pointer 140 may point to the row that has been fetched and is currently residing in vector register Vu. For example, in FIG. 1, pointer 140 is pointing at row 0 of table 132, indicating that the element data values in row 0 of table 132 are residing in vector register Vu.

Additionally, in FIG. 1, the output data vector may be stored in vector register Vx. The processor may loop through table 132 row-by-row by fetching a row from table 132 and placing the row in the data value vector. The processor may process the row in the data value vector by applying a conditional operator to each element in the address value vector to determine whether to update the output data vector. The processor may retrieve one or more element data values from the data value vector based on the determination of whether to update the output data vector. When the processor is finished processing the row, the processor may fetch the next row in table 132, place the row in the data value vector, and perform similar actions (e.g., applying a conditional operator to each element in the address value vector) to determine whether to update the output data vector. Additionally, the address value vector may be used to determine where to place the retrieved element data values in the output data vector.

2. Update Output Data Vector Based on Applying Conditional Operator

In an embodiment, data value vector Vu may be one of a plurality of vectors in table 132, and the set of elements in address value vector Vv may correspond to one or more addresses in table 132. Processor 101 may receive a pointer referencing data value vector Vu in table 132 and increment the pointer to reference a second data value vector of the plurality of vectors in table 132. The second data value vector may include element data values. For each element data value in the second data value vector, processor 101 may determine whether to update output data vector Vx based on applying the conditional operator. Applying the conditional operator may ensure that the element data value that is being stored into the output data value is the proper element data value, in an embodiment, control unit 150 applies the conditional operator to each element of the set of elements in the address value vector. More details on this are below.

In an embodiment, for each element data value in the data value vector, control unit 150 may determine whether to update the output data vector based on applying the conditional operator to each element in the address value vector. Processor 101 may read each element of the set of elements in the address value vector to determine the element address. In an example, if the conditional operator is applied to an element in the address value vector and a result of the application of the conditional operator is of a first value, the element data value corresponding to the element address is retrieved from the data value vector and the output data vector is updated with the retrieved element data value. Further, if the conditional operator is applied to an element in the address value vector and a result of the application of the conditional operator is of a second value, the output data vector is not updated.

Each element in the address value vector and referenced by pointer 140 may be associated with abuse address. In an example, each element in the address value vector includes a first base address and a first offset value. The first base address may correspond to a particular row in table 132, and the first offset may indicate which element data value to retrieve from data value vector Vu. In an example, when a result of the conditional operator satisfies a condition, processor 101 retrieves an element data value from data value vector Vu based on the offset. The first offset value may also be used as an index to map the corresponding element data value from vector register Vu to output data vector Vx. Additionally, pointer 140 may reference an address value including a second base address and a second offset value. The second base address may correspond to another particular row of table 132 that is stored in the data value vector. In an embodiment, applying the conditional operator includes comparing the base address of each element in the address value vector to the base address referenced by pointer 140. In this way, processor 101 may determine whether the respective element in the address value vector corresponds to the same row as any of the element data values in the data value vector.

In FIG. 1, address value vector Vv includes eight elements, and each element may be an address corresponding to an element data value in data value vector Vu. Additionally, pointer 140 references row 0 of table 132. When pointer 140 references row 0 of table 132, the base address referenced by pointer 110 may be "0" (row 0 in table 132), and row 0 is stored in data value vector Vu. Similarly, when pointer 140 references row 1 of table 132, the base address referenced by pointer 140 may be "1" (row 1 in table 132), and row 1 is stored in data value vector Vu.

For each element data value in Vu, processor 101 may determine whether to update output data vector 124 based on comparing the base addresses associated with address value vector Vv and pointer 140. In an example, for an element in address value vector Vv, when the base address of the element does not match the base address referenced by pointer 140, processor 101 determines that output data vector Vx should not be updated. In another example, for an element in address value vector Vv, when the base address of the element matches the base address referenced by pointer 140, processor 101 determines that output data vector Vx should be updated. When the base address of the element matches the base address referenced by pointer 140, this is an indication that the element data value corresponding to the address is the correct element data value to place in the output data vector.

In FIG. 1, for address value vector Vv[0]=6, the base address may be "0" (element 6 is at stored row 0 in table 132), and the offset may be "110" (representation of "6" in binary). Additionally, the base address referenced by pointer 140 may be "0" (row 0 in data value vector Vu). Applying the conditional operator to Vv[0] in the above example, both of the base addresses match. Accordingly, processor 101 may retrieve the element data value from data value vector Vu based on the offset. For example, processor 101 may retrieve element data value "i6" from Vu[6] and place the element data value "i6" into output data vector Vx.

In contrast, for address value vector Vv[1]=10, the base address may be "1" (element 10 is stored at row 1 in table 132), and the offset may be "010" (representation of "2" in binary). Additionally, the base address referenced by pointer 140 may be "0" (row 0 in data value vector Vu). Applying the conditional operator to Vv[1] in the above example, the base address included in Vv[1] does not match the base address referenced by pointer 140. Accordingly, processor 101 may determine not to update output data vector Vx. The base address comparison may be implemented on the remaining elements in the address value vector to identify those element data values in the data value vector that are of the same row of the elements in the address value vector. Applying the conditional operator to each element of the set of elements in address value vector Vv, processor 101 may determine to update output data vector Vx based on the base address matches between Vv[0], Vv[2], Vv[4], Vv[6], and Vv[7], and pointer 140.

Accordingly, the matching of the base addresses ensures that the applicable rows match, and that the element data value stored in that row is the appropriate element data value to place into output data vector Vx.

For simplicity, this disclosure illustrates vector register file 120 as having three vector registers. This is not intended to be limiting. In another embodiment, vector register file 120 may have fewer than or greater than three vector registers.

Further, this disclosure illustrates table 132 as having two rows with eight columns. This is not intended to be limiting. In another embodiment, table 132 may have fewer than or greater than two rows and fewer than or greater than eight columns.

In an example, processor 101 may receive an instruction Vx=Vinstr(Vu, Vv, pointer), where data value vector Vu includes 32 element data values from a table, vector register Vv includes 32 destination addresses that are 32 bits each and correspond to output data vector Vx, and the pointer is a pointer into the table.

The instruction may be to perform the following:

```
for(i=0; i<32;i++)
    if((Vv[i]&0xffffffe0)==(pointer&0xffffffe0)
        Vx[1]=Vu[Vv[i]&0x1f];
```

Processor 101 may mask out the lower M bits of the pointer into the table and also the lower M bits of the each element in address value vector Vv. In this way, processor 101 may easily identify whether the base addresses associated with the pointer and each element in address value vector Vv match, and then identify the offset included in the element in address value vector Vv. The base address is formed by masking the lower bits of the pointer and the lower bits of the address value vector. If the base addresses match, then the offset (e.g., the masked lower bits) of the element in address value vector Vv may readily be used to retrieve the element data value corresponding to the appropriate index from the data value vector. The retrieved element data value may be placed into output data vector Vx.

The conditional operator has been described as being a comparison of the base addresses associated with pointer 140 and address value vector Vv. This is not intended to be limiting, and other conditional operators may be used to determine whether to update output data vector Vx. For example, applying the conditional operator may include performing a logical operation (e.g., XOR, NAND, NOR) on each element in address value vector Vv. In another example, applying the conditional operator may include determining whether a set of upper bits in each element in address value vector Vv is greater than a set of upper bits in the address referenced by pointer 140.

Additionally, the conditional operator may include an operation code. In an example, the conditional operator includes a scalar value, and applying the conditional operator includes applying the conditional operator to an element in the address value vector and the scalar value.

3. Horizontal Permute Control Vector

As discussed, for each element data value in data value vector Vu, processor 101 may determine whether to update output data vector Vx based on applying the conditional operator. Processor 101 may retrieve element data values from data value vector Vu based on the determination of whether to update output data vector Vx.

Figure 2:
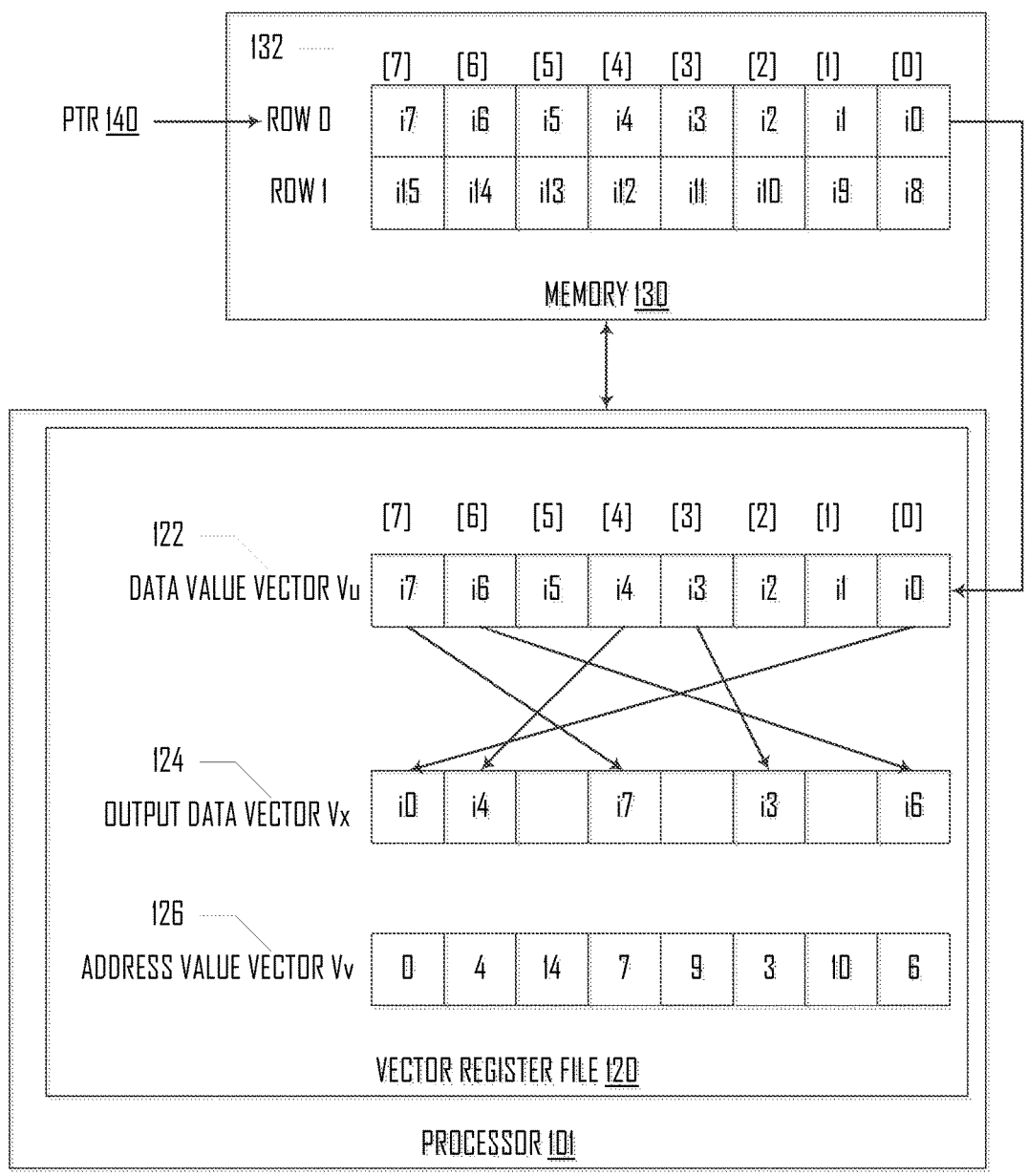
FIG. 2 is another block diagram illustrating a system for updating the output data vector using a horizontal permute control, according to an embodiment.

FIG. 2 is another block diagram 200 illustrating a system for updating the output data vector using a horizontal permute control, according to an embodiment.

In keeping with the above example, in FIG. 1, processor 101 may determine to update output data vector Vx based on the base address matches between elements in address value vector Vv, Vv[0], Vv[2], Vv[4], Vv[6], and Vv[7], and pointer 140. Vv[0]=6, and element data value "i6" is stored at data value vector Vu[6]. Accordingly, the element data value "i6" may be retrieved and placed in output data vector Vx. Similarly, Vv[2]=3, and element data value "i3" is stored at data value vector Vu[3]. Accordingly, the element data value "i3" may be retrieved and placed in output data vector Vx. Similar logic may be applied to retrieve element data value "i7" (corresponding to address value vector Vv[4]), element data value "i4" (corresponding to Vv[6]), and element data value "i0" (corresponding to address value vector Vv[7]).

The address value vector may be a horizontal permute control that rearranges the retrieved element data values in Vu into output data vector Vx in a horizontal manner. In an embodiment, the address value vector is implemented using a crossbar. In FIG. 2, the element data values retrieved from data value vector Vu have been placed into output data vector Vx based on the address value vector. The retrieved element data values may be mapped to element data values in output data vector Vx based on address value vector Vv, and the element data values in output data vector Vx may be updated with the retrieved element data values based on the mapping.

For example, in FIG. 2, Vv[0]=6, indicating that element data value "i6" should be placed at Vx[0]; Vv[2]=3, indicating that element data value "i3" should be placed at Vx[2]; Vv[4]=7, indicating that element data value "i7" should be placed at Vx[4]; Vv[6]=4, indicating that element data value "i4" should be placed at Vx[6]; and Vv[7]=0, indicating that element data value "i0" should be placed at Vx[7]. Output data vector Vx illustrates the update of address value vector Vx based on the mapping.

Output data vector Vx may have one or more elements that have not yet been updated. For example, output data vectors Vx[1], Vx[3], and Vx[5] have not been updated yet. This may reflect the inability to find the element data value corresponding to address value vectors Vv[1], Vv[3], and Vv[5] in row 0 of table 132. To retrieve the appropriate element data values to store at these positions, processor 101 may retrieve the element data values in the next row of table 132 and place the retrieved element data values into data value vector Vu for processing.

In an example, after row 0 of table 132 has been processed, row 1 of table 132 may be read into data value vector Vu. Processor 101 may retrieve the element data values in row 1 of table 132 and place the retrieved element data values into data value vector Vu for processing.

Figure 3:
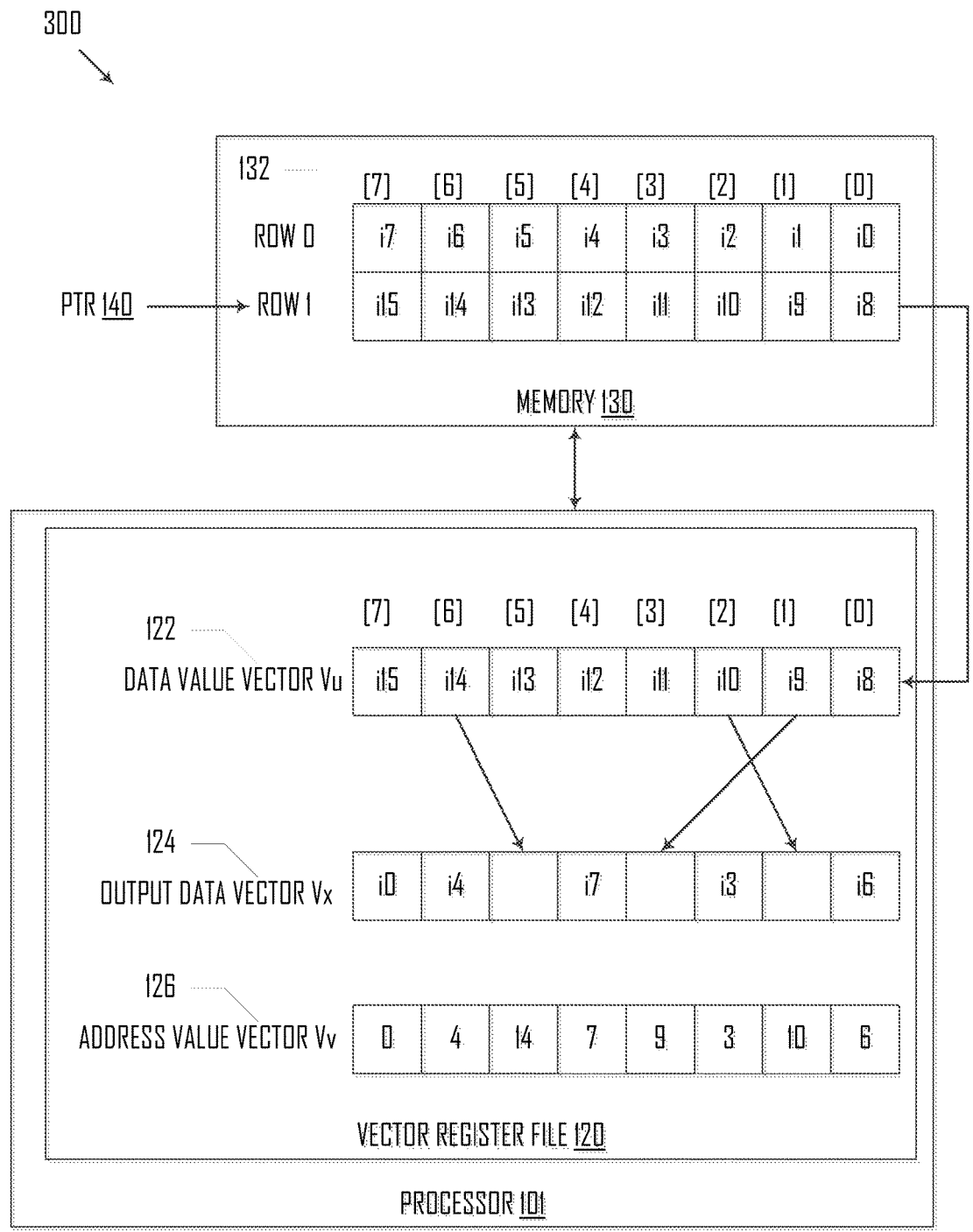
FIG. 3 is another block diagram illustrating a system for updating the output data vector after fetching another row from the table, according to an embodiment.

FIG. 3 is another block diagram 300 illustrating a system for updating the output data vector after fetching another row from the table, according to an embodiment.

To read row 1 of table 132 into data value vector Vu, processor 101 may increment pointer 140 to reference row 1 of table 132. The referenced row 1 of table 132 may then be read into data value vector Vu. Accordingly, when pointer 140 references row 1 of table 132, the base address referenced by pointer 140 may be "1" (row 1 in table 132), and row 1 is stored in data value vector Vu.

Processor 101 may apply a conditional operator to each element of the set of elements in address value vector Vv. In an example, processor 101 compares the base address of each element of address value vector Vv and the base address referenced by pointer 140 to determine whether the base addresses match. In another example, processor 101 keeps track of which indexes of output data vector Vx have already been updated and only compares the base address referenced by pointer 140 to the base address of one or more elements in address value vector Vv that do not correspond to indexes that have been updated in output data vector Vx. Processor 101 may update output data vector Vx based on the determination of whether the base addresses match.

In FIG. 3, for each element data value in data value vector Vu, processor 101 may determine whether to update output data vector Vx based on applying the conditional operator. In this example, for address value vector Vv[1]=10, the base address may be "1" (element 10 is stored at row 1 in table 132), and the offset may be "010" (representation of "2" in binary). Additionally, the base address referenced by pointer 110 may be "1" (row 1 in data value vector Vu). Applying the conditional operator to Vv[1] in the above example, both of the base addresses match.

Figure 4:
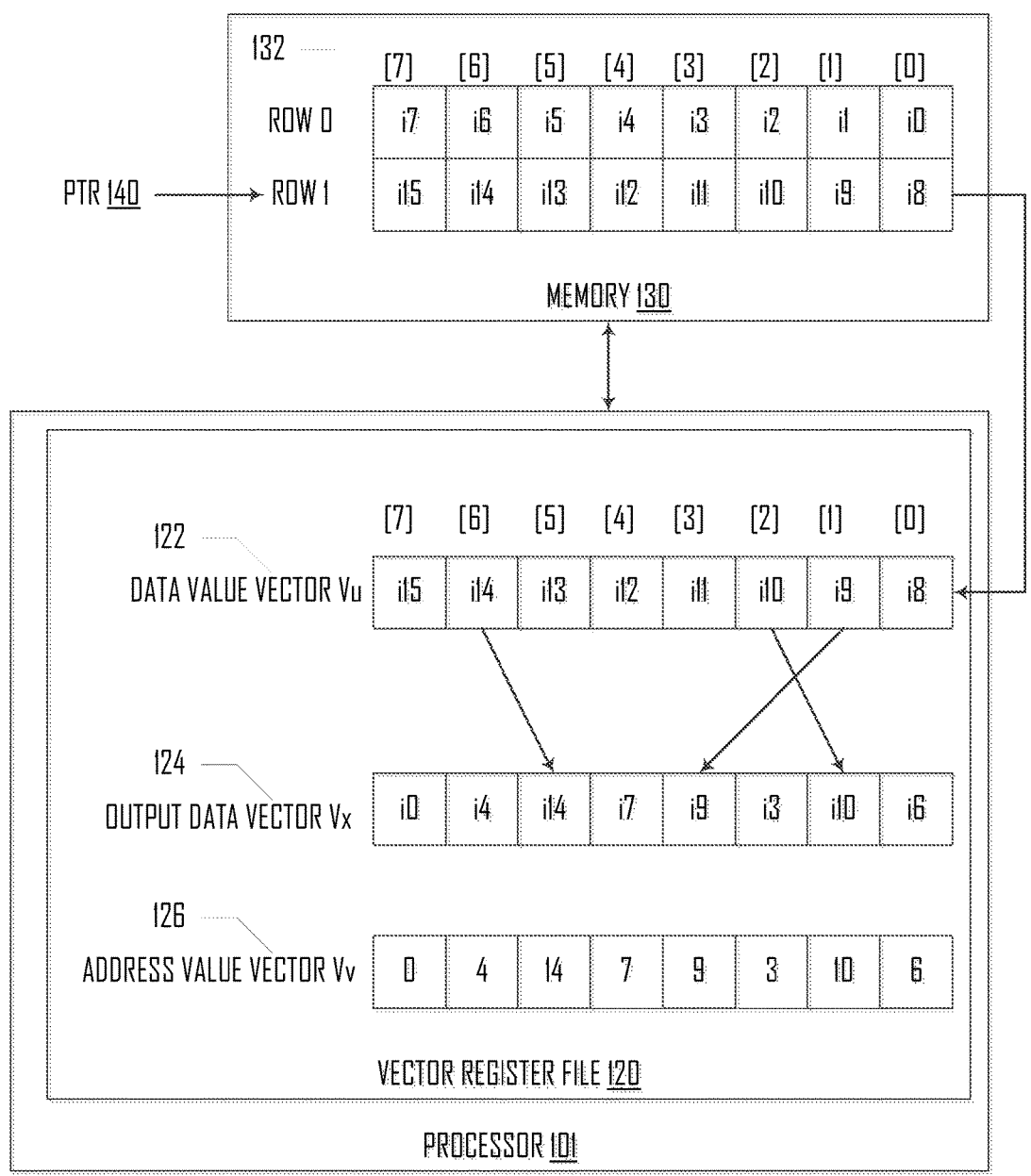
FIG. 4 is another block diagram illustrating a system for updating the output data vector using the horizontal permute control, according to an embodiment.

FIG. 4 is another block diagram 400 illustrating a system for updating the output data vector using the horizontal permute control, according to an embodiment.

In FIG. 4, keeping with the above example, processor 101 may retrieve the element data value from data value vector Vu based on the offset. For example, processor 101 may retrieve element data value "i10" from Vu[2] and place the element data value "i10" into output data vector Vx.

The base address comparison may be implemented on the remaining elements in the address value vector to identify those element data values in the data value vector that are of the same row of the elements in the address value vector. Applying the conditional operator to each element of the set of elements in address value vector Vv, processor 101 may determine to update output data vector Vx based on the base address matches between Vv[1], Vv[3], and Vv[5], and pointer 140.

Vv[1]=10, which indicates that element data value "i10" is to be stored at data value vector Vu[2]. Accordingly, the element data value "i10" may be retrieved and placed in output data vector Vx. Similarly. Vv[3]=9, which indicates that element data value "i9" is to be stored at data value vector Vu[1]. Accordingly, the element data value "i9" may be retrieved and placed in output data vector Vx. Similarly, Vv[5]=14, Which indicates that element data value "i14" is to be stored at data value vector Vu[6]. Accordingly, the element data value "i14" may be retrieved and placed in output data vector Vx.

The address value vector may be a horizontal permute control that rearranges the retrieved element data values in Vu into output data vector Vx in a horizontal manner. In FIG. 4, the element data values retrieved from data value vector Vu have been placed into output data vector Vx based on the address value vector. The retrieved element data values may be mapped to element data values in output data vector Vx based on address value vector Vv, and the element data values in output data vector Vx may be updated with the retrieved element data values based on the mapping.

For example, in FIG. 4, Vv[1]=10, indicating that element data value "i10" should be placed at Vx[1]; Vv[3]=9, indicating that element data value "i9" should be placed at Vx[3]; and Vv[5]=14, indicating that element data value "i14" should be placed at Vx[5]. Output data vector Vx illustrates the update of address value vector Vx based on the mapping.

Output data vector Vx may include the element data values corresponding to the set of addresses in address value vector Vv. In this way, given a set of addresses corresponding to a table, processor 101 may retrieve an element data value that is stored at each address in the table. The element data values may be quickly identified and placed into an output data vector.

As discussed above and further emphasized here, FIGS. 1-4 are merely examples, which should not unduly limit the scope of the claims. For example, processor 101 may retrieve the address value vector and/or the data value vector from a tightly coupled memory (TCM) (not shown) associated with processor 101. In another example, processor 101 may be a co-processor that retrieves the address value vector and/or the data value vector from another processor (not shown).

Further, regarding FIGS. 1-4, although processor 101 may have been described as fetching rows in table 132 and placing the fetched rows into data value vector Vu, other techniques to fetch element data values from memory may be used. For example, processor 101 may fetch L element data values from a table and place the L element data values into data value vector Vu. After processor 101 processes the L element data values in data value vector Vu, processor 101 may fetch the next L element data values from the table and place them into data value vector Vu. L may be greater than, equal to, or less than the quantity of columns in the table.

In an example, a first data value vector that is placed into data value vector Vu and a second data value vector that is placed into data value vector Vu may be in a common row of the table. In another example, the first data value vector that is placed into data value vector Vu and the second data value vector that is placed into data value vector Vu are in different rows of the table.

Moreover, an application of an embodiment is not limited to performing lookups in a table. Rather, other applications and embodiments are within the scope of this disclosure.

B. Permutation Example

For example, an application of an embodiment may be applied to speeding up permutations. The permutation is similar to the above example in that the input data samples may be read into the data value vector and permuted using the address value vector. In an example, the data value vector is one of a set of data values in the permutation. In an embodiment, the permutation is implemented using a crossbar.

Figure 5:
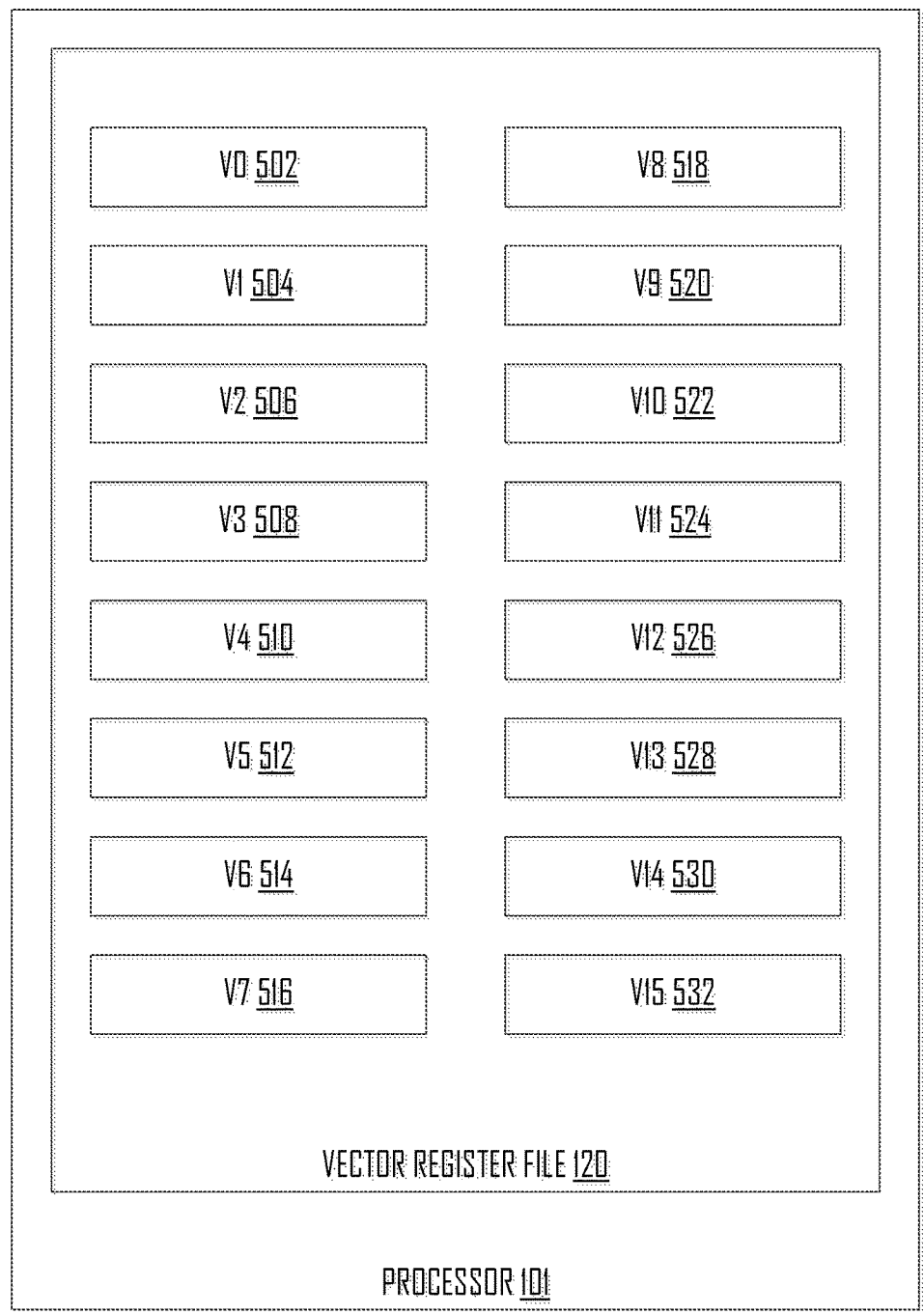
FIG. 5 is a block diagram illustrating a system for updating an output data vector, according to an embodiment.

FIG. 5 is a block diagram 500 illustrating a system for updating an output data vector, according to an embodiment.

Diagram 500 includes processor 101 and vector register file 120 including vector registers V0-V15. In an example, vector register V0 (502), vector register V1 (504), vector register V2 (506), and vector register V3 (508) include element data samples, Vector register V4 (510), vector register V5 (512), vector register V6 (514), and vector register V7 (516) may include the destination addresses corresponding to the output data vector. Vector registers V4-V7 may include the permutation index that is used to rearrange the element data samples in vector registers V0-V3. Accordingly, four sets of permutations may be implemented over the element data samples in vector registers V0-V3. In an example, vector register V0 may be permuted based on the controls in vector registers V4, V5, V6, and V7. Similarly, vector register V1 may be permuted based on the controls in vector registers V4, V5, V6, and V7. Similarly, vector register V2 may be permuted based on the controls in vector registers V4, V5, V6, and V7. Similarly, vector register V3 may be permuted based on the controls in vector registers V4, V5, V6, and V7.

Vector register V8 (518), vector register V9 (520), vector register V10 (522), and vector register V11 (524) may be the output data vectors that store the permuted element data samples. In an example, vector register V8 may store the permutation of vector register V0 based on the controls in vector register V4, Not all of the elements in vector register V8 may be populated. After using the controls in vector register V4, vector register V0 may be permuted based on the controls in vector register V5. Vector register V8 may then store the permutation of vector register V0 based on the controls in vector registers V4 and V5. Vector register V0 may then be permuted based on the controls in vector register V6 and V7. Vector register V8 may then store the permutation of vector register V0 based on the controls in vector registers V4, V5, V6, and V7 and may be fully populated. This process may be implemented on each of vector registers V1, V2, and V3 to produce permutations based on the controls in vector registers V4, V5, V6 and V7, which are then stored in vector registers V9, V10 and V11, respectively. In an example, the proper element samples are read into the output data vectors by incrementing a pointer to reference the next element samples to process.

In an example, each of vector registers V0-V3 includes P element data samples, where P is a multiple of four. In this example, each permutation may use a P×P permute engine to permute a section of the P element data samples. In an example, P=128 and 32 element samples are permuted at a time, and each element is 32 bits wide. In this example, a 32×32 crossbar may be used to permute the element samples. This may provide arbitrary sized elements. For example, two 32-bit element samples may be used with the address value vector to create a 64-bit element.

Additionally, as discussed above and further emphasized here, FIG. 5 is merely an example, which should not unduly limit the scope of the claims. For example, vector register file 120 may have fewer than or more than 16 vector registers. For example, in another embodiment, vector register file 120 includes 32 registers.

III. Example Method

Figure 6:
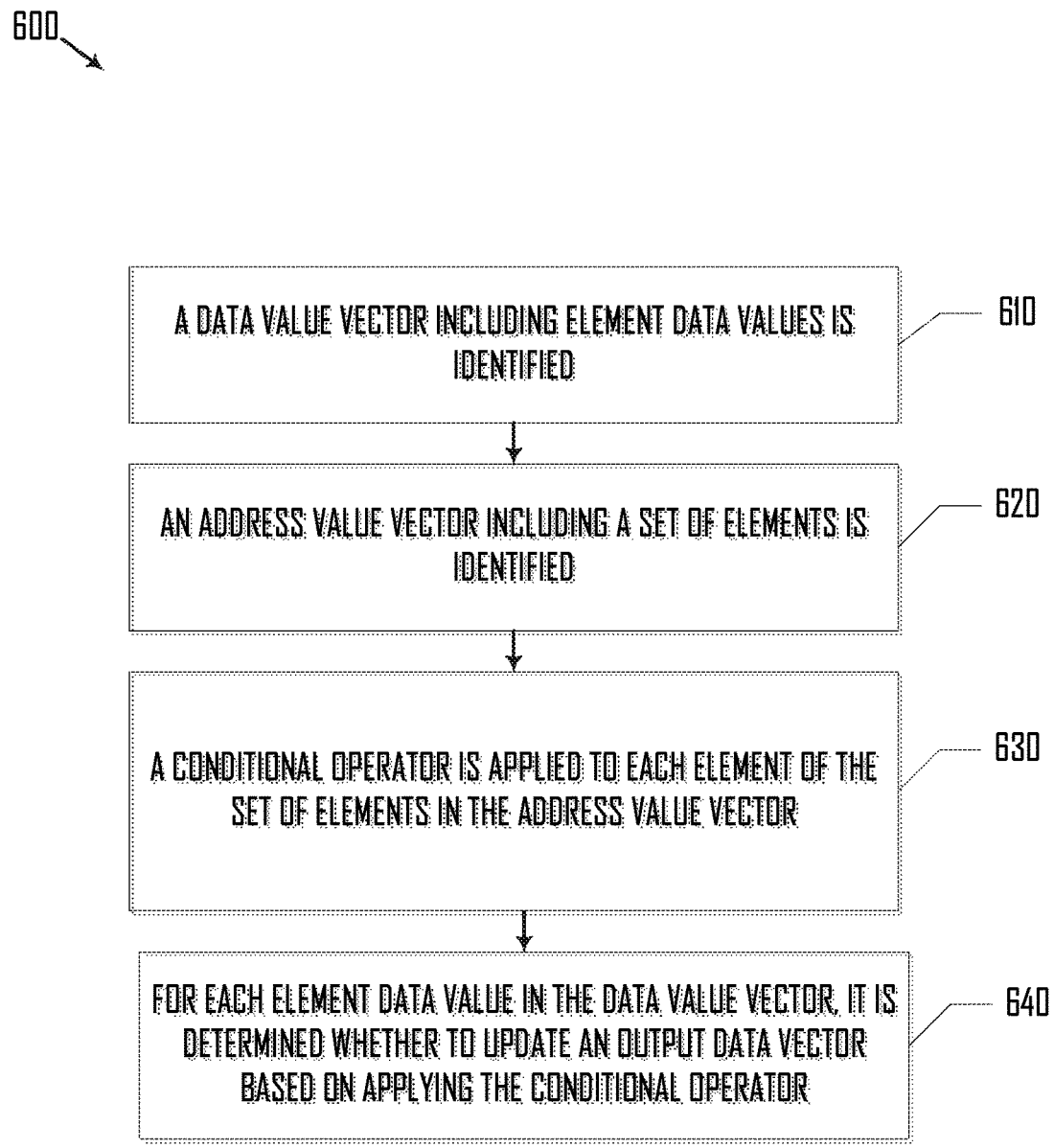
FIG. 6 is a simplified flowchart illustrating a method for updating an output data vector, according to an embodiment.

FIG. 6 is a simplified flowchart illustrating a method 600 for updating an output data vector, according to an embodiment. Method 600 is not meant to be limiting and may be used in other applications.

Method 600 includes steps 610-640. In a step 610, a data value vector including element data values is identified. In an example, control unit 150 identifies a data value vector including element data values. The data value vector may be a vector register in vector register file 120. For example, in FIG. 1, the data value vector is vector register Vu. The data value vector may include element data values from, for example, a table or element samples to permute.

In a step 620, an address value vector including a set of elements is identified. In an example, control unit 150 identifies an address value vector including a set of elements. The address value vector may be a vector register in vector register file 120. For example, in FIG. 1, the address value vector is vector register Vv. The address value vector may include elements that reference an address in a table or that are used as a horizontal permute control to update an output data vector and place the element data values in the proper place in the output data vector.

In a step 630, a conditional operator is applied to each element of the set of elements in the address value vector. In an example, control unit 150 applies a conditional operator to each element of the set of elements in the address value vector. The conditional operator may ensure that the appropriate element data values are placed into output data vector Vx. Although the conditional operator was described as including a compare operation, other conditional operations are within the scope of this disclosure.

In a step 640, for each element data value in the data value vector, it is determined whether to update an output data vector based on applying the conditional operator. In an example, for each element data value in the data value vector, control unit 150 determines whether to update an output data vector based on applying the conditional operator. When the proper element data value is retrieved from the data value vector, the retrieved element data value may be used to update output data vector Vx.

It is also understood that additional method steps may be performed before, during, or after steps 610-640 discussed above. It is also understood that one or more of the steps of method 600 described herein may be omitted, combined, or performed in a different sequence as desired.

IV. Example Wireless Device

Figure 7:
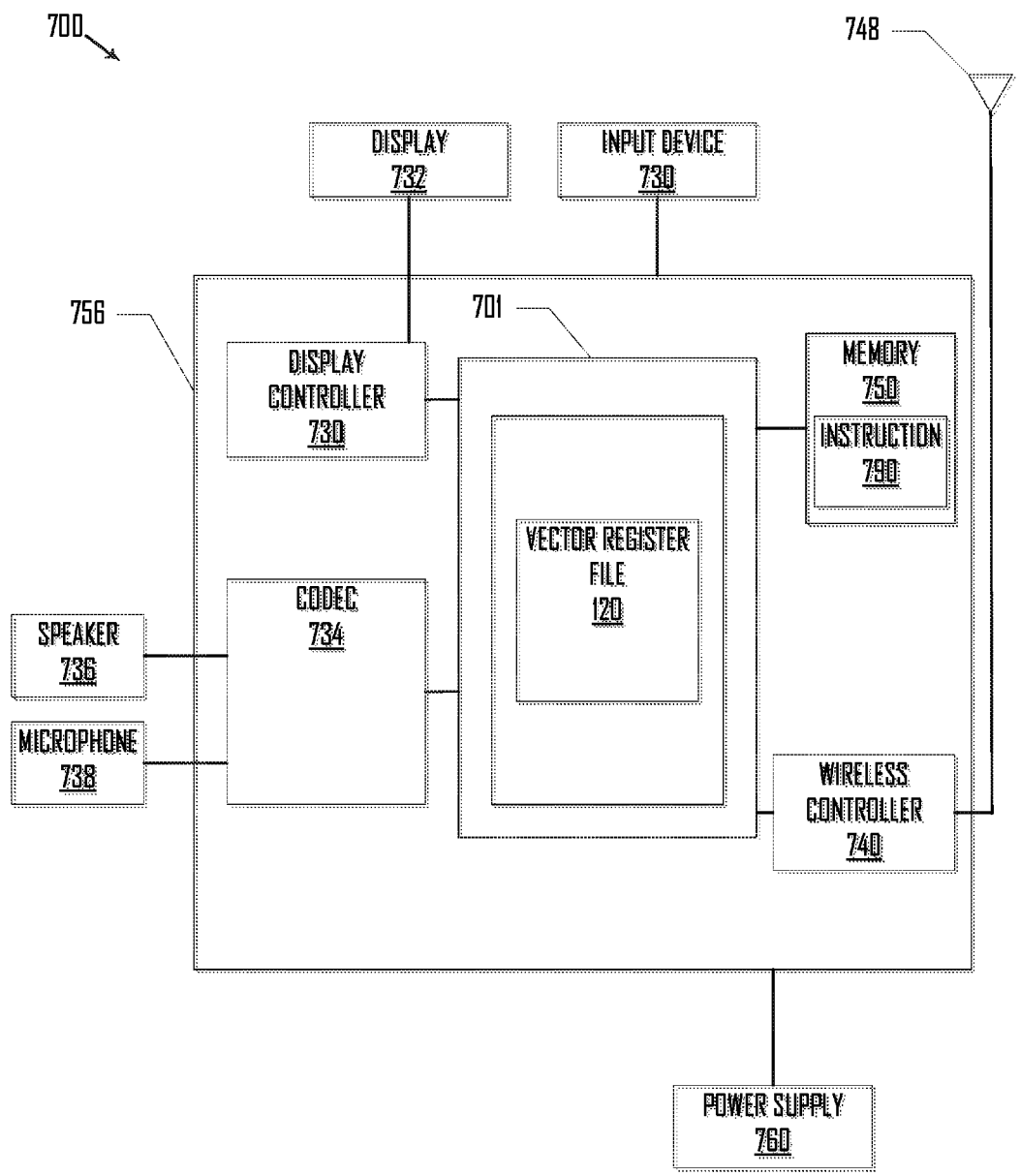
FIG. 7 is a block diagram illustrating a wireless device including a digital signal processor, according to an embodiment.

FIG. 7 is a block diagram illustrating a wireless device 700 including a digital signal processor, according to an embodiment, Device 700 includes a processor, such as a digital signal processor (DSP) 701 to process an instruction 790. Instruction 790 may be stored in a memory 750, and VRF 120 may be included in DSP 701. In an example, DSP 701 processes instruction 701 according to one or more of FIGS. 1-5, and according to the method of FIG. 6, or any combination thereof.

FIG. 7 also shows a display controller 730 that is coupled to DSP 701 and to a display 732. A coder/decoder (CODEC) 734 may also be coupled to DSP 701. A speaker 736 and a microphone 738 may be coupled to CODEC 734. Additionally, a wireless controller 740 may be coupled to DSP 701 and to a wireless antenna 748. In an embodiment, DSP 701, display controller 732, memory 750, CODEC 734, and wireless controller 740 are included in a system-in-package or system-on-chip device 756.

In an embodiment, input device 730 and a power supply 760 are coupled to system-on-chip device 756. Moreover, in an embodiment, as illustrated in FIG. 7, display 728, input device 730, speaker 736, microphone 738, wireless antenna 748, and power supply 760 are external to system-on-chip device 756. Each of display 732, input device 730, speaker 736, microphone 738, wireless antenna 748, and power supply 760 may be coupled to a component of system-on-chip device 756, such as an interface or a controller.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of updating an output data vector, the method comprising:
   identifying a data value vector comprising element data values;
   identifying an address value vector comprising address elements, wherein an address element in the address value vector comprises a first base address;
   identifying a second base address corresponding to the data value vector;
   applying a conditional operator to each element of the address elements in the address value vector, wherein the applying of the conditional operator comprises comparing the first base address to the second base address; and
   determining whether to update the output data vector with an element data value of the data value vector based on applying of the conditional operator.

2. The method of claim 1, further comprising:
   retrieving the element data values from the data value vector;
   mapping the retrieved element data values to element data values in the output data vector based on the address value vector; and updating the element data values in the output data vector with the retrieved element data values based on the mapped retrieved element data values.

3. The method of claim 2, wherein the address element in the address value vector includes an offset, and wherein retrieving of the element data values comprises retrieving the element data value from the data value vector based on the offset.

4. The method of claim 3, further comprising determining whether a set of bits of the address element is greater than a set of bits in the second base address.

5. The method of claim 4, further comprising, in response to a determination that the first base address matches the second base address, updating the output data vector.

6. The method of claim 4, wherein the output data vector remains unchanged based on a determination that the first base address does not match the second base address.

7. The method of claim 1, wherein the data value vector is one of a plurality of vectors in a table, and wherein the address elements in the address value vector correspond to one or more addresses in the table.

8. The method of claim 7, further comprising:
receiving a pointer referencing the data value vector in the table;
incrementing the pointer to reference a second data value vector of the plurality of vectors in the table, the second data value vector comprising second element data values; and
for each of the second element data values in the second data value vector, determining whether to update the output data vector based on a result of applying of the conditional operator.

9. The method of claim 8, wherein the data value vector and the second data value vector are in a common row of the table.

10. The method of claim 8, wherein the data value vector and the second data value vector are in different rows of the table.

11. The method of claim 1, wherein the data value vector is one of a set of data values in a permutation.

12. The method of claim 1, wherein the conditional operator comprises an operation code.

13. The method of claim 1, wherein the conditional operator comprises a scalar value, and wherein applying of the conditional operator comprises applying the conditional operator to an address element in the address value vector.

14. An apparatus for updating an output data vector, the apparatus comprising:
a processor that is operable to:
identify a data value vector comprising element data values;
identify an address value vector comprising address elements, wherein an address element in the address value vector comprises a first base address;
identifying a second base address corresponding to the data value vector;
apply a conditional operator to each element of the address elements in the address value vector, wherein applying the conditional operator comprises comparing the first base address to the second base address; and
determine whether to update the output data vector with an element data value of the data value vector based on application of the conditional operator.

15. The apparatus of claim 14, wherein the processor is further operable to:
retrieve the element data values from the data value vector based on a determination of whether to update the output data vector;
map the retrieved element data values to element data values in the output data vector based on the address value vector to generate a mapping; and
update the element data values in the output data vector with the retrieved element data values based on the mapping.

16. The apparatus of claim 15, wherein the address element in the address value vector includes an offset, and wherein the processor is further operable to:
retrieve the element data value from the data value vector based on the offset.

17. A non-transitory computer-readable storage medium having stored thereon computer-executable instructions for performing operations comprising:
identifying a data value vector comprising element data values;
identifying an address value vector comprising address elements, wherein an address element in the address value vector comprises a first base address;
identifying a second base address corresponding to the data value vector;
applying a conditional operator to each element of the address elements in the address value vector, wherein the applying of the conditional operator comprises comparing the first base address to the second base address; and
determining whether to update an output data vector with an element data value of the data value vector based on applying of the conditional operator.

18. The non-transitory computer-readable storage medium of claim 17, the operations further comprising:
retrieving the element data values from the data value vector;
mapping the retrieved element data values to element data values in the output data vector based on the address value vector; and
updating the element data values in the output data vector with the retrieved element data values based on the mapped retrieved element data values.

19. An apparatus for updating an output data vector, the apparatus comprising:
means for identifying a data value vector comprising element data values;
means for identifying an address value vector comprising address elements, wherein an address element in the address value vector comprises a first base address;
means for identifying a second base address corresponding to the data value vector;
means for applying a conditional operator to each of the address elements in the address value vector, wherein the applying of the conditional operator comprises comparing the first base address to the second base address; and
means for determining, for each element data value in the data value vector, whether to update the output data vector with an element data value of the data value vector based on application of the conditional operator.

20. The apparatus of claim 19, further comprising:
means for retrieving element data values from the data value vector based on a determination, by the means for determining, of whether to update the output data vector;

means for mapping the retrieved element data values to element data values in the output data vector based on the address value vector; and means for updating the element data values in the output data vector with the retrieved element data values based on a mapping, by the means for mapping, of the retrieved element data values to the element data values in the output data vector.

\* \* \* \* \*